United States Patent
Asthana et al.

(10) Patent No.: US 11,308,437 B2
(45) Date of Patent: Apr. 19, 2022

(54) BENCHMARK SCALABILITY FOR SERVICES

(71) Applicant: International Business Machines Corporation, Armonk, NY (US)

(72) Inventors: Shubhi Asthana, Santa Clara, CA (US); Valeria Becker, Buenos Aires (AR); Aly Megahed, San Jose, CA (US); Michael E. Rose, Owensboro, KY (US); Brian D. Yost, Superior, CO (US); Taiga Nakamura, Sunnyvale, CA (US); Hovey R. Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 16/102,622

(22) Filed: Aug. 13, 2018

(65) Prior Publication Data
US 2020/0050993 A1 Feb. 13, 2020

(51) Int. Cl.
*G06Q 30/00* (2012.01)
*G06Q 10/06* (2012.01)
*G06Q 30/02* (2012.01)

(52) U.S. Cl.
CPC ..... *G06Q 10/06393* (2013.01); *G06Q 10/067* (2013.01); *G06Q 10/06313* (2013.01); *G06Q 10/06315* (2013.01); *G06Q 30/0281* (2013.01)

(58) Field of Classification Search
CPC ....... G06Q 10/06393; G06Q 10/06313; G06Q 10/06315; G06Q 10/067; G06Q 30/0281
See application file for complete search history.

(56) References Cited

U.S. PATENT DOCUMENTS

| | | | |
|---|---|---|---|
| 6,381,558 B1 | 4/2002 | Berry et al. | |
| 7,870,014 B2 * | 1/2011 | Baughn | G06Q 10/063112 705/7.14 |

(Continued)

FOREIGN PATENT DOCUMENTS

| | | |
|---|---|---|
| CN | 105324756 A | 2/2016 |
| WO | 2005017668 A2 | 2/2005 |
| WO | WO-2005017668 A2 * | 2/2005 ....... G06Q 10/06393 |

OTHER PUBLICATIONS

Toosi, et al. An Auction Mechanism for a Cloud Spot Market. ACM Transactions on Autonomous and Adaptive Systems (TAAS); vol. 11, No. 1, Article 2, Publication date: Feb. 2016; 33 pages. DOI: http://dx.doi.org/10.1145/2843945 (Year: 2016).*

(Continued)

*Primary Examiner* — Patriciah Munson
*Assistant Examiner* — Uche Byrd
(74) *Attorney, Agent, or Firm* — Zilka-Kotab, P.C.

(57) ABSTRACT

A computer-implemented method, according to one embodiment, includes: receiving an offer request including one or more desired services, and selecting available offerings, each of which include at least one of the desired services. A determination is made whether available benchmarks exist for each of the at least one desired service included in each of the selected available offerings. For each desired service determined as not having available benchmarks, a draft benchmark is computed for each of a plurality of criteria. A confidence weight is also computed for each of the draft benchmarks. The available benchmarks, the draft benchmarks, and the confidence weights are further used to construct an offer which is submitted in response to the received offer request. Moreover, the draft benchmarks and the corresponding confidence weights are re-computed for (Continued)

each of the respective desired services in response to determining that the submitted offer was not accepted.

20 Claims, 8 Drawing Sheets

(56) References Cited

U.S. PATENT DOCUMENTS

| | | | |
|---|---|---|---|
| 8,862,656 B2 | 10/2014 | Olchanski et al. | |
| 9,697,490 B1 | 7/2017 | Piper et al. | |
| 9,996,442 B2 | 6/2018 | France | |
| 10,037,393 B1 | 7/2018 | Polovick et al. | |
| 10,037,506 B2 | 7/2018 | Mole et al. | |
| 2001/0051913 A1* | 12/2001 | Vashistha | G06Q 40/04 705/37 |
| 2002/0035495 A1* | 3/2002 | Spira | G06Q 30/0205 705/7.36 |
| 2003/0004779 A1 | 1/2003 | Rangaswamy et al. | |
| 2005/0033631 A1* | 2/2005 | Wefers | G06Q 30/0201 705/7.29 |
| 2009/0192867 A1* | 7/2009 | Farooq | G06Q 10/06 705/7.29 |
| 2011/0119115 A1 | 5/2011 | Xu et al. | |
| 2011/0161246 A1 | 6/2011 | Gottschalg | |
| 2011/0213659 A1* | 9/2011 | Fontoura | G06Q 30/02 705/14.52 |
| 2012/0072253 A1* | 3/2012 | Ritter | G06Q 10/06393 705/7.13 |
| 2014/0278807 A1* | 9/2014 | Bohacek | G06Q 30/0206 705/7.35 |
| 2014/0344023 A1 | 11/2014 | Chiu et al. | |
| 2017/0004430 A1 | 1/2017 | Auradkar et al. | |
| 2017/0262362 A1 | 9/2017 | Duttagupta et al. | |
| 2017/0345099 A1 | 11/2017 | Villalonga et al. | |
| 2018/0060771 A1 | 3/2018 | Mangin | |
| 2018/0181898 A1 | 6/2018 | Viswanath et al. | |

OTHER PUBLICATIONS

Iosup, A., "IaaS Cloud Benchmarking: Approaches, Challenges, and Experience," TUDelft presentation, May 7, 2013, 106 pages.

Lenk et al., "What are you paying for? Performance benchmarking for Infrastructure-as-a-Service offerings," DBLP Conference paper, Jul. 2011, 9 pages.

Altenhoff et al., "Standardized benchmarking in the quest for orthologs," Nature Methods, vol. 13, No. 5, May 2016, 9 pages.

Kauffman et al., "Valuation of Benchmark Provisions in IT Services Contracts," Institutional Knowledge at Singapore Management University, 14th annual International Conference on Electronic Commerce, Aug. 2012, 3 pages.

* cited by examiner

| Offering | Geography | Services | Confidence Scores Based on feature similarity | Total confidence score |
|---|---|---|---|---|
| X | Asia, Philippines | Service A (onshore) | Based on geography – 0.1 | 0.1 *benchmark + 0.2 *benchmark |
| | | Service B | Delivery location – 0.2 | |
| | | Service C | Based on scope – 0.3 Delivery location – 0.2 | 0.3* benchmark + 0.2 * benchmark |
| | | Service D | Based on Scope- 0.3 Based on configuration – 0.4 | 0.3 * benchmark + 0.4 * benchmark |
| Y | Europe, Croatia | Service E | Based on Configuration – 0.4 Based on configuration – 0.4 | 0.4 * benchmark + 0.4 * benchmark |
| | | Service F | Based on scope – 0.3 | 0.3 * benchmark |
| | | | Based on scope – 0.3 Delivery location – 0.2 | 0.3 * benchmark + 0.2 * benchmark |

FIG. 6

BENCHMARK SCALABILITY FOR SERVICES

BACKGROUND

The present invention relates to benchmarking scalability, and more specifically, this invention relates to benchmark scaling of standardized benchmarking for services.

Information technology (IT) service providers compete to secure highly valued IT service contracts. These service contracts correspond to requests for proposals (RFPs) issued by potential customers who are in need of various IT services. Service providers typically compose multiple offers having different combinations of services, one or more of which are then submitted to the potential customer in an effort to secure the corresponding service contract.

The pricing associated with different offers is not standardized. Accordingly, a first step before pricing each service and/or offer includes preparing market benchmark pricing information in order to assess performance. This market benchmark pricing information serves as a baseline which is used to determine relevant pricing information. However, these benchmarks vary greatly between different offers, delivery locations, client geographies, client industry type, configurations, etc.

In an attempt to gain a more accurate understanding of market benchmarks, service providers attempt to prepare pricing solutions using their in-house benchmark data which they have derived from previously completed deals. However, these benchmark data may not be complete for all services. Hence, service providers cannot compose offers with an accurate price without also implementing this benchmark data. In some instances, $3^{rd}$ party vendors offer market benchmark data derived from pricing of previously completed deals. However, it undesirable for a service provider to purchase up-to-date market benchmark data for all services all the time from these $3^{rd}$ party vendors. As a result, service providers have conventionally been unable to compose offers which accurately address a given RFP, much less at a competitive and accurate price with respect to competitors.

SUMMARY

A computer-implemented method, according to one embodiment, includes: receiving an offer request which includes one or more desired services, and selecting available offerings, each of the selecting available offerings including at least one of the desired services. A determination is made as to whether available benchmarks exist for each of the at least one desired service included in each of the selected available offerings. For each desired service determined as not having available benchmarks, a draft benchmark is computed for each of a plurality of criteria. A confidence weight is also computed for each of the draft benchmarks. The available benchmarks, the draft benchmarks, and the confidence weights are further used to construct an offer which is submitted in response to the received offer request. Moreover, the draft benchmarks and the corresponding confidence weights are re-computed for each of the respective desired services in response to determining that the submitted offer was not accepted.

A computer program product, according to another embodiment, includes a computer readable storage medium having program instructions embodied therewith. The computer readable storage medium is not a transitory signal per se. Moreover, the program instructions are readable and/or executable by a processor to cause the processor to perform a method which includes: receiving, by the processor, an offer request which includes one or more desired services; and selecting, by the processor, available offerings, each of the selecting available offerings including at least one of the desired services. A determination is made, by the processor, whether available benchmarks exist for each of the at least one desired service included in each of the selected available offerings. For each desired service determined as not having available benchmarks, a draft benchmark is computed, by the processor, for each of a plurality of criteria. A confidence weight is also computed, by the processor, for each of the draft benchmarks. The available benchmarks, the draft benchmarks, and the confidence weights are used, by the processor, to construct an offer which is submitted, by the processor, in response to the received offer request. Moreover, the draft benchmarks and the corresponding confidence weights are re-computed, by the processor, for each of the respective desired services in response to determining that the submitted offer was not accepted.

A system, according to yet another embodiment, includes: a processor; and logic integrated with the processor, executable by the processor, or integrated with and executable by the processor. The logic is configured to: receive, by the processor, an offer request which includes one or more desired services; and select, by the processor, available offerings, each of the selecting available offerings including at least one of the desired services. A determination is made, by the processor, whether available benchmarks exist for each of the at least one desired service included in each of the selected available offerings. For each desired service determined as not having available benchmarks, a draft benchmark is computed, by the processor, for each of a plurality of criteria. A confidence weight is also computed, by the processor, for each of the draft benchmarks. The available benchmarks, the draft benchmarks, and the confidence weights are further used, by the processor, to construct an offer which is submitted, by the processor, in response to the received offer request. Moreover, the draft benchmarks and the corresponding confidence weights are re-computed, by the processor, for each of the respective desired services in response to determining that the submitted offer was not accepted.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6 is a representational view of an excerpt of a dataset in accordance with an in-use example.

DETAILED DESCRIPTION

Figure 1:
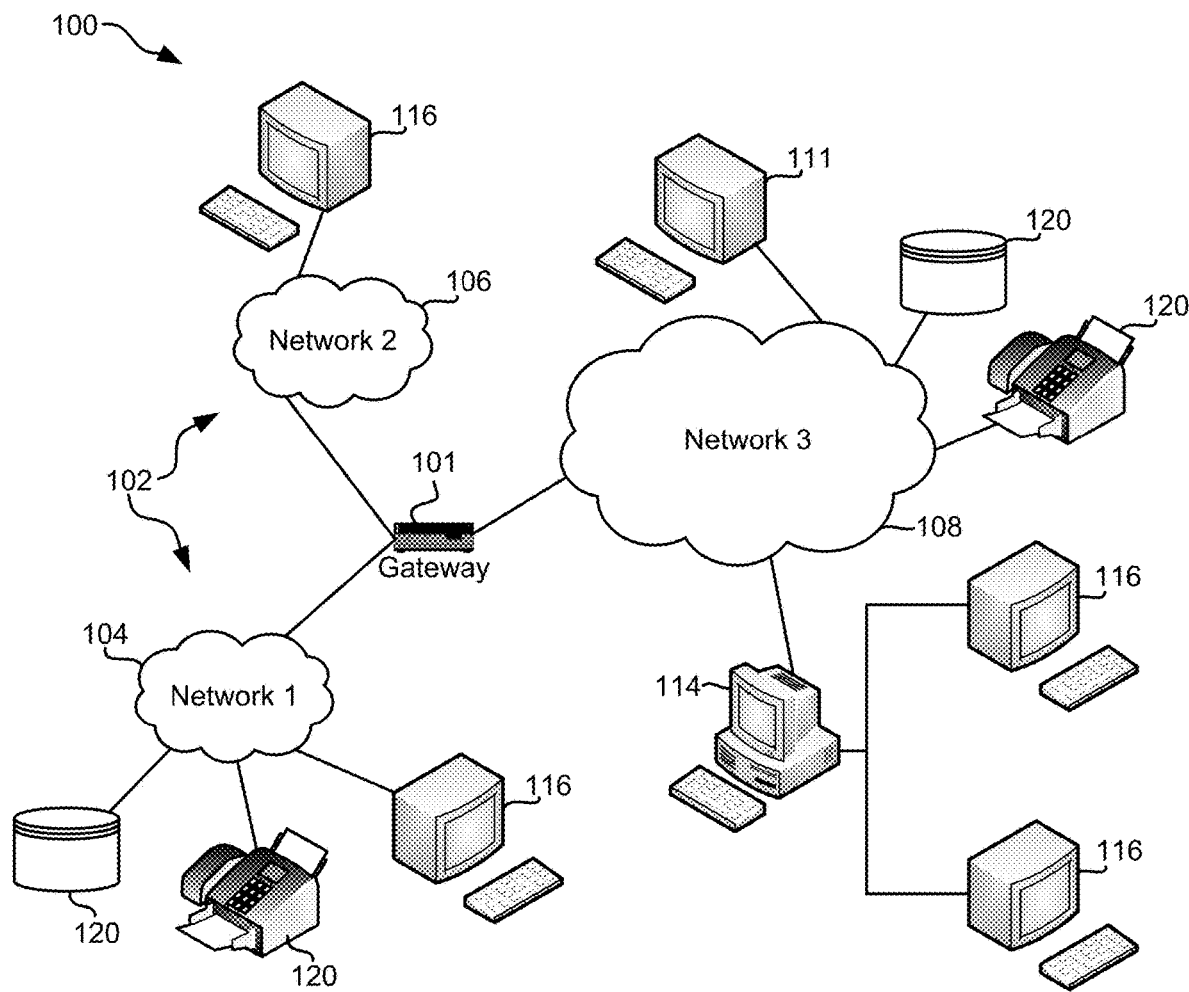
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for accurately inferring unknown benchmarks through an iterative process which is able to scale standardized benchmarking of available offerings and services. Some of the embodiments included herein are also able to compute confidence scores which correspond to the drafted benchmarks, and standardize the confidence scores based on performance in situations which actually use the benchmarks, e.g., as will be described in further detail below.

In one general embodiment, a computer-implemented method includes: receiving an offer request which includes one or more desired services, and selecting available offerings, each of the selecting available offerings including at least one of the desired services. A determination is made as to whether available benchmarks exist for each of the at least one desired service included in each of the selected available offerings. For each desired service determined as not having available benchmarks, a draft benchmark is computed for each of a plurality of criteria. A confidence weight is also computed for each of the draft benchmarks. The available benchmarks, the draft benchmarks, and the confidence weights are further used to construct an offer which is submitted in response to the received offer request. Moreover, the draft benchmarks and the corresponding confidence weights are re-computed for each of the respective desired services in response to determining that the submitted offer was not accepted.

In another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: receiving, by the processor, an offer request which includes one or more desired services; and selecting, by the processor, available offerings, each of the selecting available offerings including at least one of the desired services. A determination is made, by the processor, whether available benchmarks exist for each of the at least one desired service included in each of the selected available offerings. For each desired service determined as not having available benchmarks, a draft benchmark is computed, by the processor, for each of a plurality of criteria. A confidence weight is also computed, by the processor, for each of the draft benchmarks. The available benchmarks, the draft benchmarks, and the confidence weights are used, by the processor, to construct an offer which is submitted, by the processor, in response to the received offer request. Moreover, the draft benchmarks and the corresponding confidence weights are re-computed, by the processor, for each of the respective desired services in response to determining that the submitted offer was not accepted.

In yet another general embodiment, a system includes: a processor; and logic integrated with the processor, executable by the processor, or integrated with and executable by the processor. The logic is configured to: receive, by the processor, an offer request which includes one or more desired services; and select, by the processor, available offerings, each of the selecting available offerings including at least one of the desired services. A determination is made, by the processor, whether available benchmarks exist for each of the at least one desired service included in each of the selected available offerings. For each desired service determined as not having available benchmarks, a draft benchmark is computed, by the processor, for each of a plurality of criteria. A confidence weight is also computed, by the processor, for each of the draft benchmarks. The available benchmarks, the draft benchmarks, and the confidence weights are further used, by the processor, to construct an offer which is submitted, by the processor, in response to the received offer request. Moreover, the draft benchmarks and the corresponding confidence weights are re-computed, by the processor, for each of the respective desired services in response to determining that the submitted offer was not accepted.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
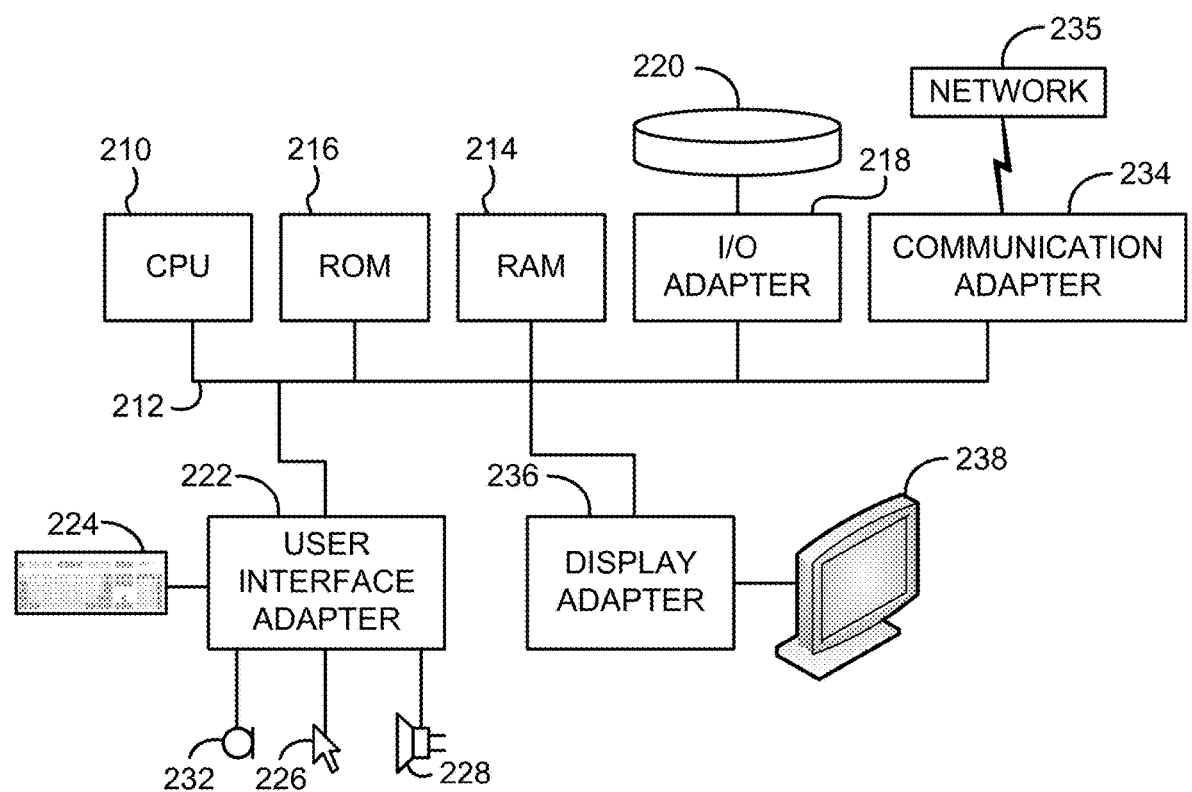
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
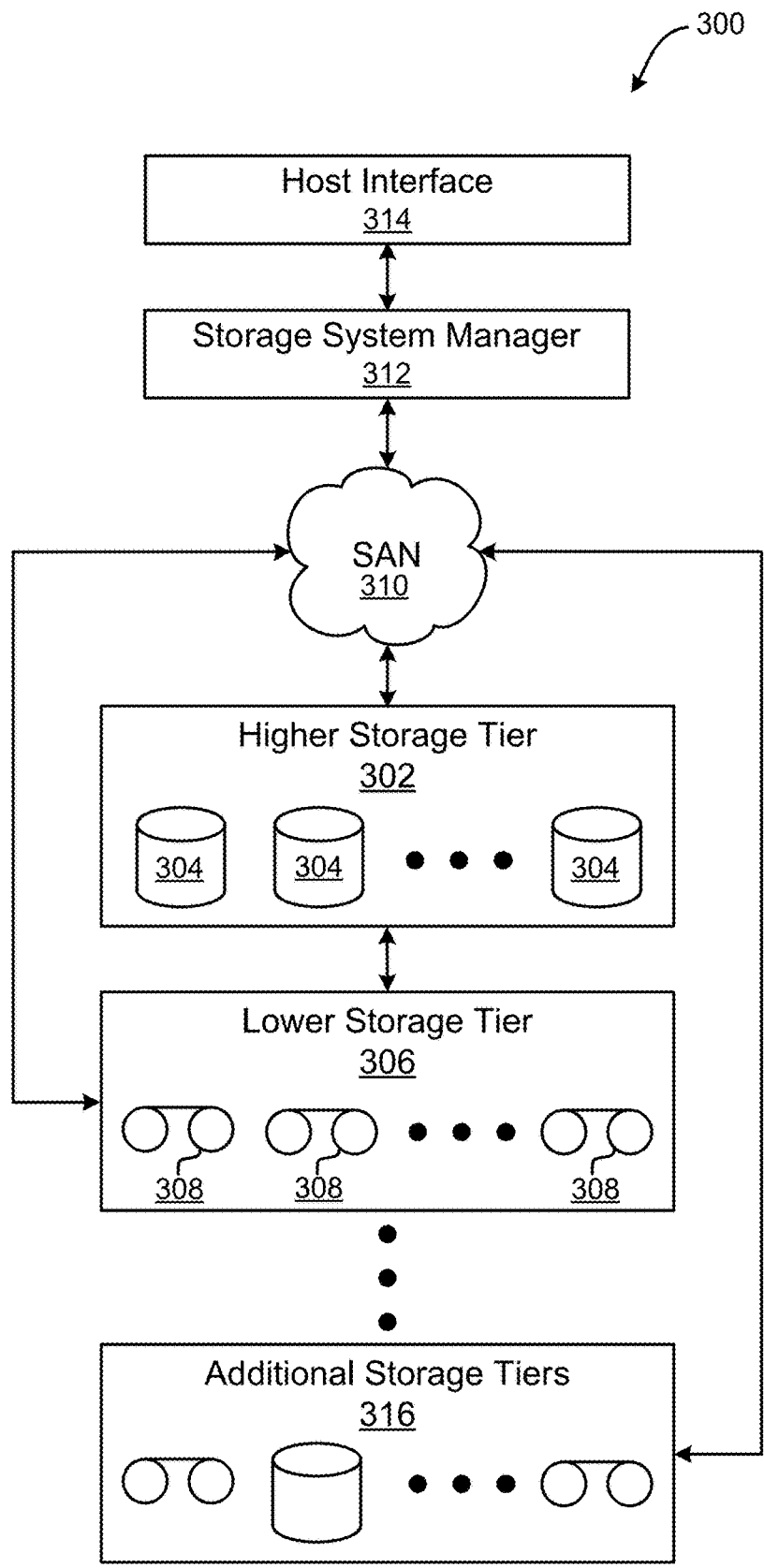
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, IT service providers compete to secure highly valued IT service contracts which correspond to RFPs issued by potential customers. Service providers typically compose multiple offers having different combinations of services, one or more of which are then submitted to the potential customer in an effort to secure the corresponding service contract. However, the pricing associated with different offers is not standardized. Accordingly, a first step before pricing a given offer includes preparing market benchmark pricing information in order to assess performance. This market benchmark pricing information serves as a baseline which is used to determine relevant pricing information. Nevertheless, these benchmarks vary greatly between different offers, delivery locations, client geographies, client industry type, configurations, etc.

In an attempt to gain a more accurate understanding of market benchmarks, $3^{rd}$ party vendors offer market benchmark data derived from pricing of previously completed deals. This market benchmark data may be used to infer some market benchmarks, but is often incomplete. For example, market benchmark data offered by $3^{rd}$ party vendors typically has missing information which significantly reduces the accuracy by which market benchmarks may be inferred.

Conventionally, these holes in the market benchmark data offered by $3^{rd}$ party vendors are patched by assuming the missing data is equal, or similar, to known portions of the data. While this provides enough information for market benchmarks to ultimately be determined, the benchmarks which are determined are typically inaccurate. Moreover, the extent of the inaccuracy is not known, thereby causing many conventional offers submitted in response to RFPs to be priced significantly too high or significantly too low, ultimately causing the service contract opportunity to be lost. As a result, service providers have conventionally been unable to compose offers which accurately address a given RFP, much less at a competitive and accurate price with respect to competitors.

In sharp contrast, various ones of the embodiments included herein provide involved methods which are able to accurately infer unknown information, and thereby draft benchmarks using an iterative process. Some of the embodiments included herein are also able to compute confidence scores which correspond to the drafted benchmarks, and standardize the confidence scores based on performance in situations which actually use the benchmarks. Moreover, embodiments included herein are able to draft accurate benchmarks, even in situations where corresponding information is lost and/or unavailable. As a result, the various embodiments described and/or referred to herein are able to achieve scalability for benchmarking of relevant services at an accuracy which is significantly higher than conventionally achievable, e.g., as will be described in further detail below.

Figure 4A:
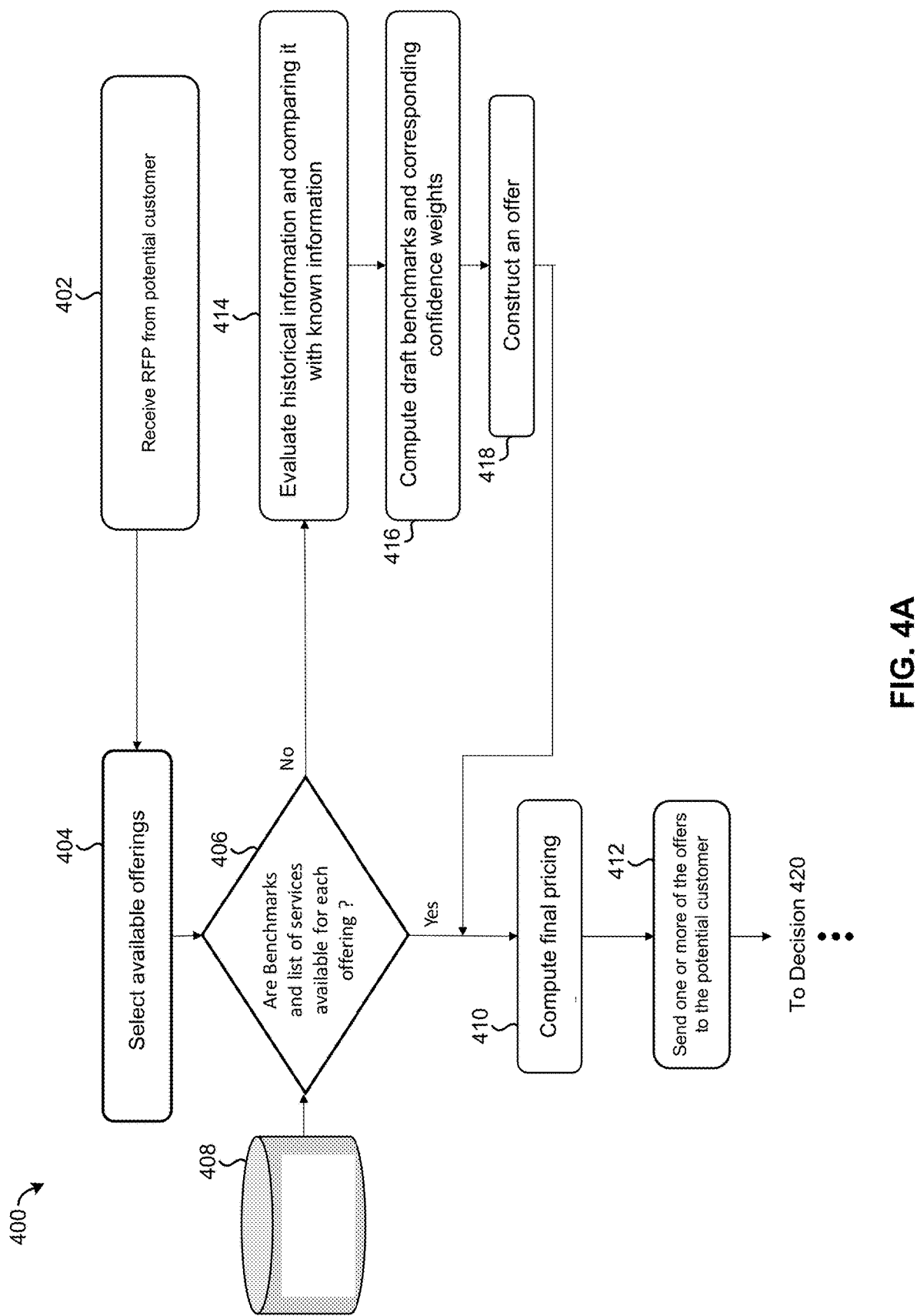
FIG. 4A is a flowchart of a method in accordance with one embodiment.
Figure 4A:
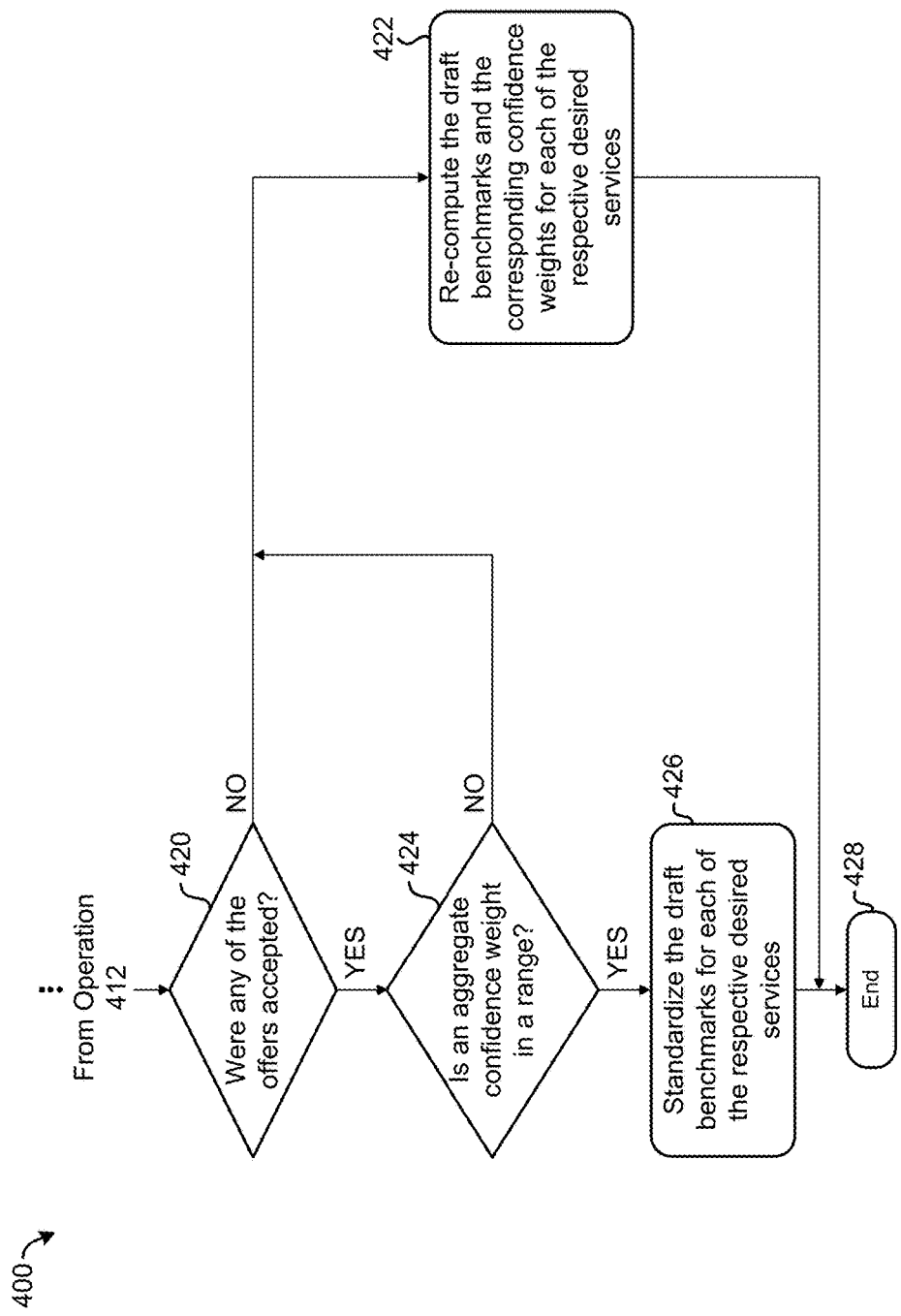

Referring now to FIG. 4A, a high-level flowchart of a method 400 for scaling the standardized benchmarking of available offerings and services, is shown according to one embodiment. The method 400 may be performed in accordance with the present invention in any of the environments depicted in FIGS. 1-3, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment. For example, in some embodiments, one or more of the processes included in method 400 are performed by a processor located at and/or in communication with a service provider. However, in various other embodiments, the method 400 may be partially or entirely performed by a controller, a processor, a computer, etc., or some other device having one or more processors therein. Thus, in some embodiments, method 400 is a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4A, operation 402 of method 400 includes receiving an offer request from a potential customer. In some approaches, the offer request is an RFP which is received from a potential customer. However, it should be noted that an RFP is in no way required in order for method 400 to be performed successfully and accurately. As mentioned above, one or more of the processes included in method 400 are performed by a processor located at and/or in communication with a service provider in some approaches. Accordingly, the various processes included in FIG. 4A have been described from the perspective of a service provider. It should be noted that this is in no way intended to be limiting, but rather has been presented by way of example only, and solely to place various embodiments in a given context.

It follows that the offer request received in operation 402 is received by a service provider in some approaches. An offer request typically corresponds to a situation in which the potential customer is looking for one or more particular services to be met. Accordingly, in some approaches the offer request received in operation 402 includes information (e.g., metadata) which corresponds to the potential customer themselves and/or the particular services the potential customer is looking to have met. In some approaches, at least some of this information (e.g., metadata) may correspond to certain benchmarks which in turn correlate to "similarity criteria", e.g., such as minimum standards, geography, industry, scope, configuration, delivery location(s), etc. Accordingly, benchmarks may be categorized based on the similarity criterion which they correlate to. Moreover, benchmarks categorized as being correlated to the same similarity criterion may be compared to each other to determine confidence weights thereof and/or other similarity metrics, e.g., as would be appreciated by one skilled in the art after reading the present description.

Moving to operation 404, here method 400 includes selecting available (e.g., previously offered, currently supported, etc.) offerings, each of which include at least one of the desired services included in the offer request. The service provider may have a number of preconfigured offerings, each of which include a different combination of services and/or are offered at a different price. Thus, the information received with the offer request can be used to determine specific ones of these available offerings which are able to satisfy the one or more services desired by the potential customer. For instance, benchmarks of an available offering which correlate to the same similarity criteria as benchmarks received in the offer request are compared to determine a level of resemblance between the available offering and the particular offer request. Accordingly, the information is used in some approaches to identify available offerings which are sufficiently similar to the offer request.

However, in some approaches, one or more custom offers are selectively formed (e.g., constructed) to more closely meet the received offer request. These custom offers may further be compared to other available offers which the service provider may have already implemented in response to securing a service contract with another customer, are supported by the service provider, are most profitable to the service provider, most efficiently meet the potential customer's requests, etc., in order to identify similar offers which are available.

Referring still to FIG. 4A, decision 406 includes determining whether available benchmarks exist for each of the at least one desired service included in each of the selected available offerings. This determination is made in some approaches by deciding whether an adequate number of the desired services are included in each of the offerings determined in operation 404. The determination is further made in some approaches by deciding whether the number of benchmarks associated with each of the offerings is sufficient. As mentioned above, holes in market benchmark data have caused significant inaccuracies for offers formed in conventional situations. Thus, decision 406 essentially includes deciding whether each of the offerings include an amount of information (e.g., benchmarks) which is sufficient to accurately construct a new offer which represents the services offered, the corresponding pricing information, etc. in response to the offer request received. That way the service provider has an accurate understanding of the services being offered, and the potential customer is able to make an informed decision of whether to accept the offer.

Historical information including lists of services, corresponding benchmarks, confidence scores, performance data, etc. is stored in memory 408 which is accessible by the controller, processor, computer, etc. which is performing the processes of method 400 in some approaches. This historical information may be accumulated in memory 408 over time as various offers are formed and sent to potential customers. Moreover, a result of whether each of the various offers are actually accepted by the potential customers is indicated in some approaches. Thus, performing decision 406 includes accessing historical information from memory 408 (e.g., a database) in some approaches.

Method 400 proceeds to operation 410 in response to determining that an adequate list of services and corresponding benchmarks are available for each offering determined in operation 404. There, operation 410 includes computing the final pricing of each of the offers determined in operation 404. In some approaches, the final pricing is computed using the similar offerings identified as being available (e.g., supported by the service provider) and/or the benchmarks corresponding thereto. A confidence weight for each of the benchmarks may also be used to indicate how accurate or how confident the service provider should be, while using this benchmark for pricing purposes. Accordingly, the pricing information associated with each of the similar offerings may be used to extrapolate the final pricing information for each of the one or more determined offers.

However, in some approaches the final pricing information is only determined for one offer identified as being a best fit for the offer request initially received from the potential customer. For example, the final pricing information may only be determined for an offer which includes services that most closely match the service requests of the potential customer included in the offer request. According to another example, the final pricing information may only be determined for an offer which includes benchmarks which most closely match benchmarks of the offer request, e.g., as identified in the metadata received with the offer request.

Furthermore, operation 412 includes sending one or more of the offers and the corresponding final pricing information to the potential customer. However, as mentioned above, only one offer and the corresponding final pricing information is sent in response to the received offer request in some approaches. Moreover, the one or more offers and corresponding pricing information is sent directly to the potential customer in some approaches, e.g., in an electronic document via email, in a text field presented on a prespecified website, by mailing a physical document to a prespecified address, etc.

Returning to decision 406, method 400 proceeds to operation 414 in response to determining that an adequate list of services and corresponding benchmarks are not available for each offering determined in operation 404. In other words, method 400 proceeds to operation 414 for each desired service determined as having at least some missing benchmarks, which indicates that there are gaps in the relevant information involved with making an accurate and competitive offer to the potential customer. According to some approaches, method 400 proceeds to operation 414 in response to determining that a given service does not include benchmarks which correlate to the same similarity criteria as one or more of the benchmarks included in the offer request received.

As shown, operation 414 includes evaluating historical information and comparing it with information which is known about the received offer request and the one or more desired services included therein. It follows that in preferred approaches, this comparison identifies portions of the historical information which are sufficiently similar to the services and corresponding benchmarks included in the offer request. Moreover, these identified portions may be used to compensate for any missing benchmarks in order to make an accurate and competitive offer in response to the received offer request, e.g., as will be described in further detail below.

The historical information evaluated in operation 414 may include any one or more of local and/or global geographic data, service and/or sub-service configurations, implementation scope, delivery location, etc. of the offer. Moreover, operation 416 includes computing similarity-based draft benchmarks as well as a corresponding confidence weight for each of the similarity-based draft benchmarks. The draft benchmarks and corresponding confidence weights are computed using results of the evaluation performed in operation 414 in preferred approaches. As a result, the draft benchmarks and corresponding confidence weights accurately fill in any gaps in (e.g., unavailable portions of) the relevant information, thereby providing benchmarks which match those included in the offer request.

In other approaches, computing the draft benchmarks for each desired service determined as not having available benchmarks includes using calculated similarities to identify services which are similar to each of the respective desired services. Similarities between services may be calculated using a Euclidean distance, Mahalanobis distance, Pearson similarity, cosine similarity, etc., or any other type of calculation which would be apparent to one skilled in the art after reading the present description. The amount of correlation between two services which constitutes them as being "similar" to each other varies depending on the situation. For instance, the amount of correlation between two services depends on features such as geography, configuration, client industry, delivery location, scope, etc. In other words, calculated similarities are determined using one or more similarity criteria selected from the group consisting of geography, delivery location, scope, configuration, etc. in some approaches. The prerequisites of determining two or more services to be similar to each other is even predefined by a user in some approaches.

Operation 418 further includes using the available benchmarks, the draft benchmarks, and the corresponding confidence weights to construct an offer. The offer is preferably constructed by comparing the available benchmarks and the draft benchmarks with benchmarks included in the offer request such that the services and/or sub-services which the respective benchmarks correspond to are implemented in the offer. Moreover, the confidence weights are also used in some approaches to factor the relative significance afforded to each of the services and/or sub-services in determining how accurate the pricing of the particular service can be.

In some approaches, operation 418 includes aggregating the available benchmarks and the draft benchmarks into a combined benchmark which is then used to construct the offer. The way in which the different benchmarks are aggregated varies depending on the particular approach. For instance, in some approaches an average of the available benchmarks and the draft benchmarks is computed. In other approaches, a median value, an $n^{th}$ percentile, a mode value, etc. may be calculated and used to form a combined benchmark. Moreover, the confidence weights are used in some approaches to properly weight each of the respective benchmarks while computing the combined benchmark.

From operation 418, method 400 jumps to operation 410 whereby the final pricing of the constructed offer is computed.

Returning to operation 412, determining whether any of the one or more offers sent to the potential customer are actually accepted is desirable for the service provider as this information allows the service provider to determine whether the services offered will actually be implemented. Accordingly, decision 420 includes determining whether any of the one or more offers sent to the potential customer were actually accepted by the potential customer. The determination made in decision 420 may be made based on whether a confirmation is received from the potential customer, a deadline is reached without hearing back from the potential customer, etc. In response to determining that any of the one or more offers sent to the potential customer are not actually accepted, method 400 proceeds to operation 422 which includes re-computing the draft benchmarks and the corresponding confidence weights for each of the respective desired services. Re-computing the draft benchmarks and/or the corresponding confidence weights may provide insight into why none of the offers sent were ultimately accepted by the potential customer, as will be described in further detail below (e.g., see FIG. 4B). Accordingly, operation 422 provides valuable information which can be used in future iterations of method 400, e.g., in response to receiving subsequent offer requests. From operation 422, the flowchart jumps directly to operation 428 whereby method 400 ends. However, it should be noted that although method 400 may end upon reaching operation 428, any one or more of the processes included in method 400 may be repeated in order to respond to subsequently received offer requests.

Looking again to decision 420, method 400 proceeds to decision 424 in response to determining that any of the one or more offers sent to the potential customer are actually accepted. There, decision 424 includes determining whether an aggregate confidence weight of the constructed offer is in a predefined (e.g., user-defined) range. As mentioned above, the various available benchmarks and draft benchmarks may be aggregated in some approaches. Similarly, the confidence weights corresponding to these benchmarks are aggregated as well in some approaches, e.g., by calculating an average value, determining a median value, determining a mode value, calculating an $n^{th}$ percentile, etc. It should also be noted that "in a predefined range" is in no way intended to limit the invention. Rather than determining whether a value is in a given range, equivalent determinations may be made, e.g., as to whether a value is above a threshold, whether a value is outside a predetermined range, whether an absolute value is above a threshold, whether a value is below a threshold, etc., depending on the desired approach.

Method 400 proceeds to operation 422 in response to determining that the aggregate confidence weight of the constructed offer is not in the predefined range. However, in response to determining that the confidence weight of the constructed offer is in the predefined range, the flowchart proceeds to operation 426. There, operation 426 includes standardizing the draft benchmarks for each of the respective desired services. This standardization process increases the accuracy of the draft benchmarks and makes them more applicable in future iterations of method 400. Moreover, the process of standardizing the draft benchmarks may implement any operations which would be apparent to one skilled in the art after reading the present description.

From operation 426, the flowchart proceeds to operation 428 whereby method 400 ends, e.g., as described above.

Figure 4B:
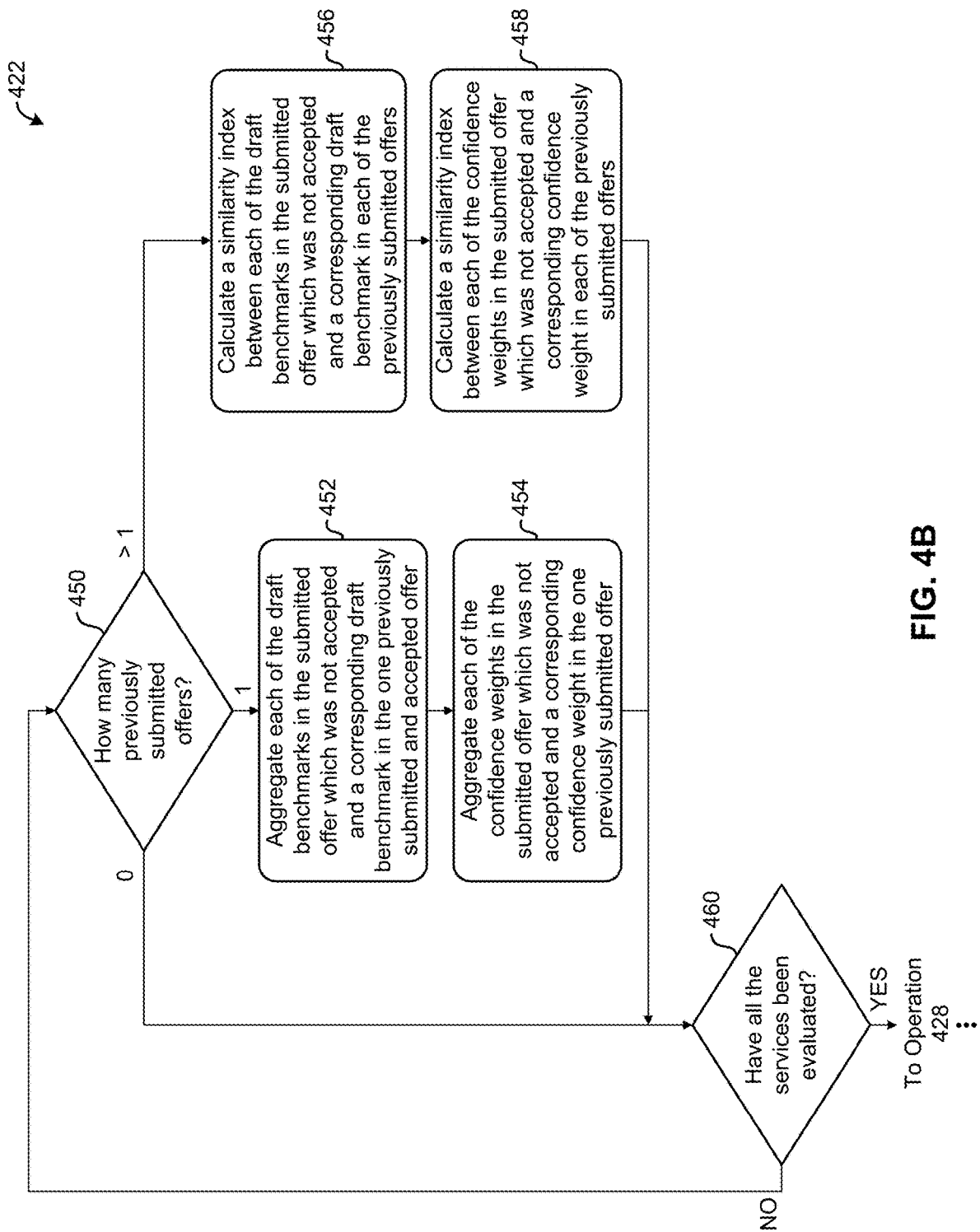
FIG. 4B is a flowchart of sub-processes for one of the operations in the method of FIG. 4A, in accordance with one embodiment.

Looking now to FIG. 4B, exemplary sub-processes of re-computing the draft benchmarks and the corresponding confidence weights are illustrated in accordance with one embodiment, one or more of which may be used to perform operation 422 of FIG. 4A. However, it should be noted that the sub-processes of FIG. 4B are illustrated in accordance with one embodiment which is in no way intended to limit the invention.

The process of re-computing the draft benchmarks and the corresponding confidence weights includes using an aggregation function in some approaches. However, the type of aggregation function and/or the way in which it is implemented varies depending on the particular situation. Thus, decision 450 includes determining a number of previously submitted offers which included the given desired service, and which were accepted by the respective customer. As mentioned above, a given offer includes one or more specific services which can be implemented in more than one different offer. Thus, decision 450 essentially includes determining how many previously submitted and accepted offers included a given service.

In response to determining that none of the previously submitted and accepted offers included the given desired service, the flowchart jumps directly to decision 460 which includes determining whether all of the services in the previously submitted offer have been evaluated. In response to determining that all of the services in the previously submitted offer have been evaluated, the process of re-computing the draft benchmarks and the corresponding confidence weights ends, and the flowchart returns to operation 428 of FIG. 4A.

However, in response to determining that all of the services in the previously submitted offer have not yet been evaluated, the flowchart returns to decision 450 from decision 460, such that a subsequent service is evaluated. Accordingly, the various processes included in FIG. 4B may be repeated in an iterative fashion for each of the desired services.

Looking again to decision 450, the flowchart proceeds to operation 452 in response to determining that the number of previously submitted offers which included the given desired service and which were accepted is one. There, operation 452 includes aggregating each of the draft benchmarks in the submitted offer which was not accepted and a corresponding draft benchmark in the one previously submitted and accepted offer. As mentioned above, an aggregation process may include calculating an average value, determining a median value, computing an $n^{th}$ percentile, etc. Accordingly, operation 452 is performed differently depending on the approach.

Operation 454 further includes aggregating each of the confidence weights in the submitted offer which was not accepted and a corresponding confidence weight in the one previously submitted offer. Again, the aggregation process may include calculating an average value, determining a median value, computing an $n^{th}$ percentile, etc. Accordingly, operation 454 is performed differently depending on the approach. In some approaches, the aggregation process performed in operation 452 is different than the aggregation process performed in operation 454. Yet, in other approaches the aggregation process performed in operation 452 is the same as the aggregation process performed in operation 454. From operation 454, the flowchart proceeds to decision 460 such that the determination performed therein may be performed.

Returning once again to decision 450, the flowchart proceeds to operation 456 in response to determining that the number of previously submitted offers which included the given desired service and which were accepted is greater than one. There, operation 456 includes calculating a similarity index between each of the draft benchmarks in the submitted offer which was not accepted and a corresponding draft benchmark in each of the previously submitted offers. The type of similarity index calculated determines a type of norm operation implemented in operation 456 depending on the approach. For instance, in different approaches, operation 456 may include calculating an L1 norm, an L2 norm, etc. In still other approaches, a different type of mathematical process which is sufficiently similar to calculating a norm value may be implemented, e.g., as would be appreciated by one skilled in the art after reading the present description.

Moving to operation 458, a similarity index (e.g., norm) is calculated between each of the confidence weights in the submitted offer which was not accepted and a corresponding confidence weight in each of the previously submitted offers. Again, any type of norm operation and/or similar types of similarity indices or other mathematical processes may be implemented depending on the particular approach. In some approaches, the aggregation process performed in operation 456 is different than the aggregation process performed in operation 458. Yet, in other approaches the aggregation process performed in operation 456 is the same as the aggregation process performed in operation 458. From operation 458, the flowchart proceeds to decision 460 such that the determination performed therein may be performed.

It follows that various ones of the embodiments included herein are able to accurately infer unknown benchmarks through an iterative process which is able to scale the standardized benchmarking of available offerings and services. Some of the embodiments included herein are also able to compute confidence scores which correspond to the drafted benchmarks, and standardize the confidence scores based on performance in situations which actually use the benchmarks. Moreover, embodiments included herein are able to draft accurate benchmarks, even in situations where corresponding information is lost and/or unavailable. As a result, scalability is achievable for benchmarking of relevant services at an accuracy which is significantly higher than conventionally achievable.

Figure 5:
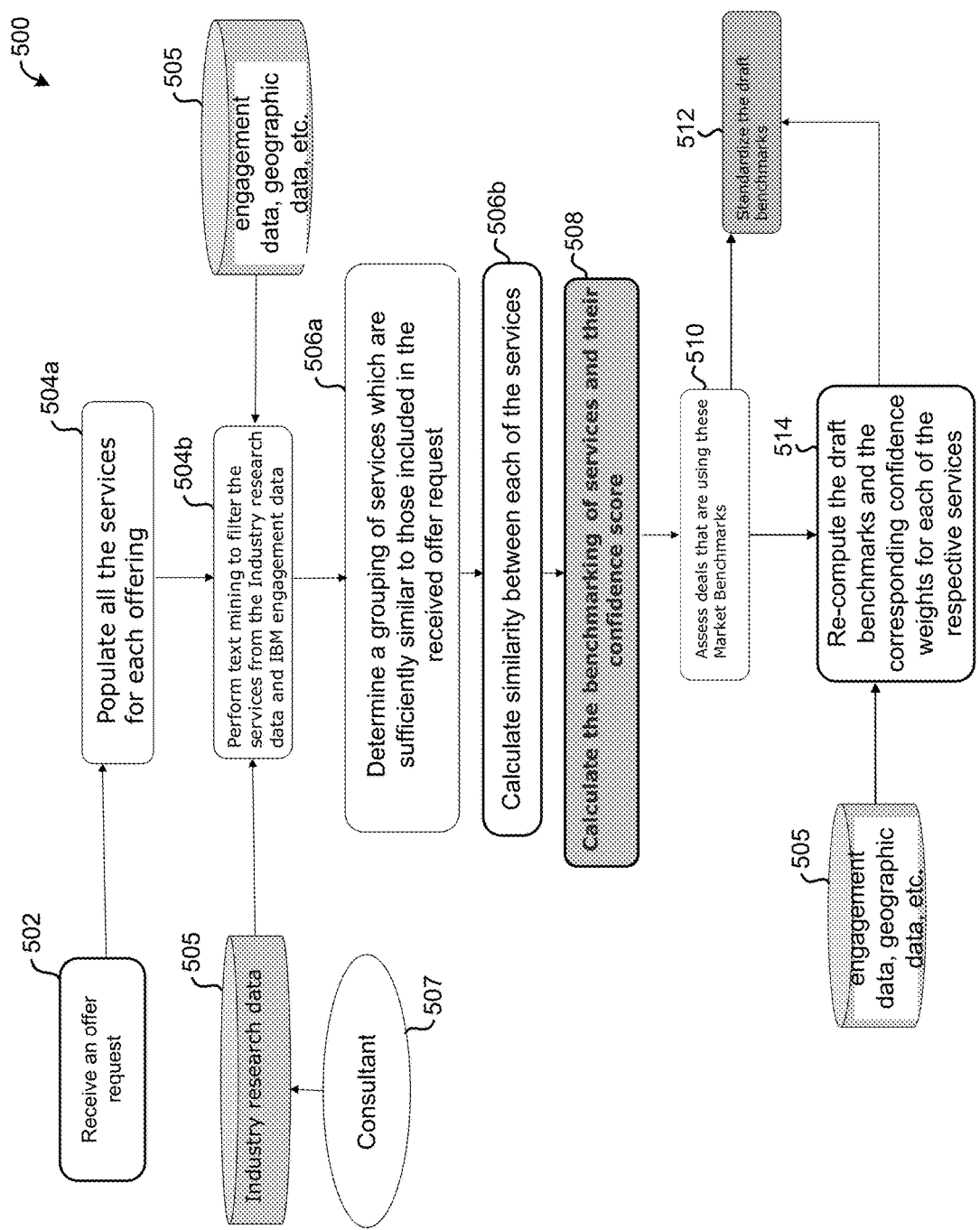
FIG. 5 is a flowchart of a method in accordance with one embodiment.

Moving to FIG. 5, a more detailed flowchart of a method 500 for scaling the standardized benchmarking of available offerings and services, is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a processor, a computer, etc., or some other device having one or more processors therein. Thus, in some embodiments, method 500 is a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, operation 502 of method 500 includes receiving an offer request from a potential customer. As mentioned above, the offer request includes information (e.g., metadata) in some approaches which corresponds to the potential customer themselves and/or the services they are seeking. For instance, in different approaches the offer request may include geography-based information, market-based information, or any other type of geographic-based information. In some approaches the offer request even includes requests for more than one offers.

A service provider which receives the offer request in operation 502 may use the information included in the request to filter available offerings and/or the services included therein. For instance, in some approaches meta information pertaining to geography, date, industry, etc. of the offer request is used to filter the available offerings and services that have the matching values for the respective fields (e.g., criteria). Each of these fields serves as a characteristic of the benchmarking for the overarching offering, thereby providing the scope of the services in each of the services.

In some approaches the offer request additionally includes one or more benchmarks which correspond to the services being requested. Accordingly, a determination may be made as to whether the offer request provides any benchmarks which may be used to compute market pricing targets.

Moving to operation 504a, here method 500 includes populating the services for each offer included in the received offer request. As mentioned above, an offer request may include requests for more than one different offer. Accordingly, operation 504a preferably includes populating the list of services which are included in each of the one or more offerings to assist in analyzing the benchmarking. In some approaches, the list of services is populated using text mining on an offering basis from one or more sources. See operation 504b. An illustrative list of sources which are available for text mining includes, but is not limited to, recent (e.g., in the last 12 months) outsourcing, competitive pricing, solution data, etc. gathered via benchmarks and solution development; market intelligence data gathered from customer interviews, partners, technical providers, etc.; industry research data, focused directly on each tower of a system; engagement and/or delivery data; etc. It follows that data is received from one or more sources used to manage the relevant data. For example, see memory 505 which is used to store industry research data as well as engagement and neighboring country data. Each of the sources may in turn receive the data managed therein through various channels, e.g., such as a consultant 507.

Again, the services are populated for each of the offers included in the received offer request. Thus, operations 504a and 504b may be repeated in an iterative fashion until the services have been populated for each of the offers. Moving to operation 506a, method 500 further includes determining a grouping (neighborhood) of services which are sufficiently similar to those included in the received offer request. This determination is performed in some approaches by evaluating the services which are available (e.g., supported by the service provider) and determining a relative similarity between each of the available services and those services included in the offer request. The relative similarity between two given services is performed using a clustering technique in some approaches, e.g., as would be appreciated by one skilled in the art after reading the present description.

In other approaches, the relative similarity between two given services is determined using benchmarks. As mentioned above, benchmarks correspond to different similarity criteria and serve as general baseline which characterizes a give service. According to an example, which is no way intended to limit the invention, benchmarks of an available service which correspond to geography, delivery location, scope of the service, and configuration criteria are compared against benchmarks of a requested service which also correspond to geography, delivery location, scope of the service, and configuration criteria respectively. A result of the comparison provides a quantifiable similarity between the available service and the requested service, thereby providing information to the service provider which can be used in selecting and/or constructing an offer in response to the originally received offer request, e.g., as would be appreciated by one skilled in the art after reading the present description.

Referring still to operation 506a, the benchmarks used to determine the relative similarity between two given services preferably correspond to one or more of a geography criterion, a configuration of services criterion, a scope of service criterion, and a delivery location criterion. Geography criteria serve as an important feature in determining the similarity between two given services as there is more scope of two neighboring countries having similar benchmarks for the same set of services and offerings. Hence if the benchmarks for a service in a country such as Spain is known, it can be used to predict that the value of a benchmark for a neighboring country such as France or Italy. Moreover, the configuration of service criteria corresponds to the level of the service, as each service typically includes a number of sub-services included therein. Accordingly, if there are two services with similar sub-services, their benchmarks would also be in a similar range. Furthermore, scope of service and delivery location of the offering correlate to how the services would be delivered to the potential customer. For instance, the potential customer typically choses where the service is needed, e.g., whether in a same geography (onshore), in a different geography (nearshore), or a far-removed geography (offshore). Benchmarks which correspond to these criteria also serve as desirable indicators when drafting benchmarks if they are missing, e.g., as will be described in further detail below.

Moving to operation 506b, a quantifiable similarity between each of the services determined in operation 506a and the respective services included in the offer request is calculated. The amount of similarity which exists between two services is performed in some approaches by incorporating engagement data, industry research data and nearby geography benchmark data. For instance, the similarity between the benchmarking of services derived from management data and externally available industry data may be calculated in operation 506a. According to an example, which is in no way intended to limit the invention, Equation 1 may be used to calculate the similarity between two given services as follows:

$$S_{ij} = \sqrt{\sum_{k \in K} (price_k^i - price_k^j)^2} \qquad \text{Equation 1}$$

Where $s_{ij}$ represents the similarity between the benchmarking of services from engagement data i and each externally available industry data j. Moreover, $price_k^i$ is the price of service k for engagement data i, $price_k^j$ is the price of service k for industry data j, and K is the set of regular sub-services in the engagement data i. As shown, Equation 1 incorporates the Euclidean Distance. However, a quantifiable similarity between two given services may be calculated using any equations and/or processes which would be apparent to one skilled in the art after reading the present description.

Referring still to FIG. 5, operation 508 further includes calculating benchmarks and their corresponding confidence scores for each of the services. As mentioned above, certain similarity criteria for a given service may have benchmarks which are unknown and/or unavailable. Accordingly, in some approaches draft benchmarks are calculated for certain criteria in certain ones of the services. Confidence scores which correspond to these draft benchmarks are also preferably calculated.

In some approaches, the confidence score for a given draft benchmark is computed using a weighting function. The weighting function uses the source of the benchmarks which were generated in a previous step as an input and generates the aggregate score of the new draft benchmark. According to an example, the weighting function may be a simple function such as adding all the weights of all the services, an average value, an arithmetic mean, etc. It follows that the resulting confidence score accounts for the importance of the given draft benchmark. However, any one or more of the approaches described herein may be implemented in order to calculate the draft benchmarks and/or the corresponding confidence scores.

Although not shown in FIG. 5, the draft benchmarks, the available benchmarks, and the corresponding confidence scores are used to construct one or more offers which are capable of satisfying the various services included in the originally received offer request. Moreover, final pricing information for each of these one or more offers is also computed using any of the approaches described herein. The one or more offers and corresponding final pricing information are then sent to the potential customer from which the original offer request was received, e.g., as described above.

Looking now to operation 510, an assessment of existing deals which are currently using the available benchmarks and the draft benchmarks computed in operation 508 above is performed. With respect to the present description, "existing deals" include offers issued in the past which were accepted by the respective potential customer, offers which have been sent to potential customers but which have not yet been accepted or denied, etc. In other words, operation 510 includes assessing existing deals that use these market benchmarks to calibrate and develop solutions that can be used in a tender-like process to secure service contracts with potential customers.

The assessment performed in operation 510 includes making two main determinations for each of the offers included in the existing deals being assessed. First, a determination is made as to whether each of the offers were actually accepted by the potential customer. If a given offer is determined to have been accepted by the potential customer, a secondary determination is made as to whether a combined confidence weight of the given offer is above a user-defined threshold. Method 500 proceeds to operation 512 for a given offer in response to determining that the offer was accepted by the potential customer and that the confidence weight for the offer is above the user-defined threshold. There, operation 512 includes standardizing the draft benchmarks for each of the services included in the accepted offer. This standardization process increases the accuracy of the draft benchmarks and makes them more applicable in future iterations of method 500. Moreover, the process of standardizing the draft benchmarks may implement any operations which would be apparent to one skilled in the art after reading the present description.

Although not shown, method 500 ends following operation 512 in some approaches. However, in other approaches method 500 returns to operation 508 following performance of operation 512, e.g., such that additional draft benchmarks and/or confidence scores may be calculated using the standardized draft benchmarks.

Returning to operation 510, method 500 proceeds to operation 514 for a given offer in response to determining either that the offer was not accepted by the potential customer, or that the confidence weight for the offer is not above the user-defined threshold. There, operation 514 includes re-computing the draft benchmarks and the corresponding confidence weights for each of the respective services in the given offer. Performing the re-computation of the draft benchmarks depends on how accurate the confidence score is and/or whether the offer was ultimately accepted or rejected by the potential customer. Accordingly, re-computing the confidence weights may provide insight into why the offer was ultimately not accepted by the potential customer. Accordingly, operation 514 provides valuable information which can be used in future iterations of method 500, e.g., in response to receiving subsequent offer requests.

The re-computing of the draft benchmarks and the corresponding confidence weights may incorporate any of the approaches included in FIG. 4B above, e.g., as would be appreciated by one skilled in the art after reading the present description. Moreover, information such as engagement data, geographic data, etc. may be accessed from memory 505 and used to perform the re-computing in operation 514.

From operation 514, method 500 proceeds to operation 512 in situations where the combined confidence weight of the given offer is above a user-defined threshold. Accordingly, the re-computed draft benchmarks having high confidence scores corresponding thereto are standardized for future use, e.g., in subsequently constructed offers. However, although not shown, method 500 ends following operation 514 in some approaches. In still other approaches method 500 returns to operation 508 following performance of operation 514, e.g., such that additional draft benchmarks and/or confidence scores may be calculated using the re-computed draft benchmarks and corresponding confidence weights.

Referring momentarily to FIG. 6, an excerpt 600 of a dataset for the offerings and confidence scores of computed draft benchmarks are illustrated in accordance with an in-use example, which is in no way intended to limit the invention. As an option, the present in-use example may be implemented in conjunction with features from any other embodiment listed herein, such as those described with reference to the other FIGS., such as FIGS. 4A-5. However, the present in-use example may be used in various applications and/or in permutations which may or may not be specifically described in the illustrative embodiments listed herein. Further, the in-use example presented herein may be implemented in any desired environment.

As shown, the excerpt 600 is presented as a table which includes several columns, each corresponding to different types of information for each available offering. For instance, Offering X corresponds to the geographical area which includes Asia and the Philippines. Moreover, Offering X includes Service A, Service B and Service C, each of which includes benchmarks which correlate to different types of similarity criteria. For example, Service B includes benchmarks which correlate to a scope of service criterion, and a delivery location criterion. Each of the benchmarks further include a confidence score which corresponds thereto, and provides some information as to how each of the benchmarks for Service B match corresponding ones of the benchmarks for a service included in a received offer request, e.g., as described above.

The excerpt 600 further includes a column which represents the total confidence score for each of the respective services. As mentioned above, confidence scores are accumulated in a number of different ways depending on the approach. For example, in some approaches the confidence scores of each of the benchmarks for a given service are accumulated using a weighting function, e.g., as would be appreciated by one skilled in the art after reading the present description.

It should be noted that the particular details depicted in excerpt 600 are in no way intended to be limiting. In other words, the information included in a dataset for the offerings may be more or less extensive than that illustrated in FIG. 6.

It follows that the various embodiments included herein relate to benchmarks of offer requests and provide an automated tool which is able to learn and scale the available benchmarks to different criteria, e.g., such as different geographies, industries, offerings, services, etc. Some approaches are further able to consider meta information (e.g., such as geography, date, industry, etc.) of the particular scenario.

This may be accomplished by applying filters in the offerings and services that have the matching values for the respective fields.

In situations where benchmarks do not already exist and/or certain benchmarks are missing, the available set of services for each offering can be mined for relevant information. Benchmarks are also analyzed in some approaches based on other types of information which serve as inputs, including industry research data; user input parameters such as geography-based information, market-based information, month for benchmarking, etc.; market intelligence data gathered from customer interviews, partners, technical providers, etc.; engagement and/or delivery data; minimum accepted confidence score to standardize a given benchmark; quantities (e.g., baselines) of the services for an offer (e.g., potential deal) to be priced and the scope of the services included therein; etc., which provide additional context. As a result, benchmarks and corresponding confidence scores are calculable for missing (e.g., unknown) portions of information being used to construct a viable offer in response to an offer request. Moreover, these benchmarks and corresponding confidence scores may be used to determine target market pricing for the offers sent to potential customers.

These improvements are able to help formulate a client pricing template by leveraging the market data available along with some relevant sources of information. Moreover, price points for newly constructed service deals can be determined from market reference baselines. As a result, a potential customer is able to obtain pricing from standard scope of available systems by targeting towards base growth and new opportunities at a relatively rapid pace. Any custom solution costs and/or pricing information can be added to final pricing information for offers ultimately presented to a potential customer.

It should also be noted that although various ones of the embodiments included herein have been described in the context of IT related offers, any one or more of these embodiments are applicable for any type of offer request received.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving, by the computer, an offer request from a potential customer, wherein the offer request includes desired services;
populating, by the computer, the desired services for each offer included in the offer request, wherein populating the desired services includes: using text mining on an offering basis from one or more sources;
determining, by the computer, a grouping of available offerings, wherein each of the available offerings in the grouping includes an available service which corresponds to at least one of the desired services;
calculating, by the computer, a quantifiable similarity between each of the available offerings in the grouping of available offerings and the desired services, respectively;
using, by the computer, the quantifiable similarities to determine whether the available offerings in the grouping of available offerings are sufficiently similar to the desired services;
determining, by the computer, whether available benchmarks exist for each of the available services included in the grouping of available offerings;
for each available service determined as not having available benchmarks:
  accessing, by the computer, historical information stored in memory,
  identifying, by the computer, portions of the historical information which are sufficiently similar to information known about the desired services included in the offer request,
  using, by the computer, the identified portions of the historical information to compute a draft benchmark for each of a plurality of criteria, and
  using, by the computer, the identified portions of the historical information to compute a confidence weight for each of the draft benchmarks;
assessing, by the computer, existing deals which currently use the available benchmarks and the draft benchmarks, wherein the existing deals include previously issued offers which have been accepted and previously issued offers which have not yet been accepted or denied;
using, by the computer, the available benchmarks, the draft benchmarks, and the confidence weights to construct an offer;
submitting, by the computer, the offer to the potential customer in response to the received offer request;
re-computing, by the computer, the draft benchmarks and the corresponding confidence weights for each of the respective available services in response to determining that the submitted offer was not accepted, wherein re-computing the draft benchmarks and the corresponding confidence weights for each of the respective available services includes:
  determining how many previously submitted and accepted offers included the given service,
  in response to determining that one of the previously submitted and accepted offers included the given service:
    aggregating each of: the draft benchmarks in the submitted offer which was not accepted, and a corresponding draft benchmark in the one previously submitted and accepted offer, and
aggregating each of: the confidence weights in the submitted offer which was not accepted, and a corresponding confidence weight in the one previously submitted and accepted offer;
standardizing, by the computer, the re-computed draft benchmarks;
storing, by the computer, the standardized re-computed draft benchmarks in memory;
using, by the computer, the re-computed draft benchmarks and the corresponding confidence weights to calculate new draft benchmarks and new corresponding confidence weights;
constructing, by the computer, a new offer using the new draft benchmarks and the new corresponding confidence weights;
outputting, by the computer, the new offer and corresponding pricing information to a text field presented on a prespecified website; and
sending, by the computer, an electronic document directly to the potential customer, the electronic document including the new offer and corresponding pricing information,
wherein the computer is located at a service provider location.

2. The computer-implemented method of claim 1, wherein re-computing the draft benchmarks and the corresponding confidence weights for each of the respective desired services includes using an aggregation function, wherein the computer is a central processing unit that is coupled to the memory.

3. The computer-implemented method of claim 2, comprising:
for each of the respective desired services, determining a number of previously submitted offers which included the given desired service and which were accepted;
in response to determining that the number of previously submitted offers which included the given desired service and which were accepted is one, aggregating each of the draft benchmarks in the one previously submitted offer which was not accepted and a corresponding draft benchmark in the one previously submitted offer; and
aggregating each of the confidence weights in the submitted offer which was not accepted and a corresponding confidence weight in the one previously submitted offer.

4. The computer-implemented method of claim 2, comprising:
for each of the respective desired services, determining a number of previously submitted offers which included the given desired service and which were accepted;
in response to determining that the number of previously submitted offers which included the given desired service and which were accepted is greater than one, calculating a L1 norm similarity index between each of the draft benchmarks in the submitted offer which was not accepted and a corresponding draft benchmark in each of the previously submitted offers; and
calculating a L1 norm similarity index between each of the confidence weights in the submitted offer which was not accepted and a corresponding confidence weight in each of the previously submitted offers.

5. The computer-implemented method of claim 1, comprising:
populating the desired services for each offer included in the offer request,
wherein populating the desired services includes:
using text mining on an offering basis from one or more sources,
wherein the one or more sources include industry research data as well as engagement and neighboring country data,
wherein the data included in the one or more sources is received from a consultant.

6. The computer-implemented method of claim 5, wherein determining whether available benchmarks exist for each of the available services included in the grouping of available offerings includes:
re-computing the draft benchmarks and the corresponding confidence weights for each of the respective desired services in response to determining that an aggregate confidence weight of the constructed offer is not in a predefined range;
deciding whether an adequate number of the desired services are included in each of the grouping of available offerings; and
deciding whether a number of benchmarks associated with each of the grouping of available offerings is sufficient,
wherein using the available benchmarks, the draft benchmarks, and the confidence weights to construct an offer includes:
aggregating the available benchmarks and the draft benchmarks into a combined benchmark,
wherein the combined benchmark is used along with the confidence weights to construct the offer.

7. The computer-implemented method of claim 1, wherein computing the draft benchmarks for each desired service determined as not having available benchmarks includes:
using calculated similarities to identify services which are similar to each of the desired services determined as not having available benchmarks,
wherein the calculated similarities are determined using one or more similarity criteria selected from the group consisting of geography, delivery location, scope and configuration.

8. A computer program product comprising a computer readable storage medium having program instructions embodied therewith, the program instructions readable and/or executable by a hardware processor to cause the processor to perform a method comprising:
receiving, by the processor, an offer request from a potential customer, wherein the offer request includes one or more desired services, wherein the processor is located at a service provider location;
selecting, by the processor, available offerings, each of which includes at least one of the desired services;
determining, by the processor, whether available benchmarks exist for each of the at least one desired service included in each of the selected available offerings;
for each desired service determined as not having available benchmarks, computing, by the processor, a draft benchmark for each of a plurality of criteria;
computing, by the processor, a confidence weight for each of the draft benchmarks;
using, by the processor, the available benchmarks, the draft benchmarks, and the confidence weights to construct an offer, wherein using the available benchmarks, the draft benchmarks, and the confidence weights to construct an offer includes:

aggregating the available benchmarks and the draft benchmarks into a combined benchmark, wherein the combined benchmark is used along with the confidence weights to construct the offer;

submitting, by the processor, the offer to the potential customer in response to the received offer request;

re-computing, by the processor, the draft benchmarks and the corresponding confidence weights for each of the respective desired services in response to determining that the submitted offer was not accepted, wherein re-computing the draft benchmarks and the corresponding confidence weights for each of the respective available services includes:
  determining how many previously submitted and accepted offers included the given service,
  in response to determining that more than one of the previously submitted and accepted offers included the given service:
    calculating a similarity index between each of: the draft benchmarks in the submitted offer which was not accepted, and a corresponding draft benchmark in each of the previously submitted and accepted offers which included the given service, and
    calculating a similarity index between each of: the confidence weights in the submitted offer which was not accepted, and a corresponding confidence weight in each of the previously submitted and accepted offers which included the given service;

standardizing, by the processor, the re-computed draft benchmarks and the corresponding confidence weights, thereby increasing the efficiency and accuracy by which the re-computed draft benchmarks are determined and applied;

storing, by the processor, the standardized re-computed draft benchmarks and the corresponding confidence weights in memory;

using, by the processor, the re-computed draft benchmarks and the corresponding confidence weights to calculate new draft benchmarks and new corresponding confidence weights;

storing, by the processor, the standardized re-computed draft benchmarks in memory;

constructing, by the processor, a new offer using the new draft benchmarks and the new corresponding confidence weights;

outputting, by the processor, the new offer and corresponding pricing information to a text field presented on a prespecified website; and sending, by the processor, an electronic document directly to the potential customer, the electronic document including the new offer and corresponding pricing information, wherein computing the draft benchmarks for each desired service determined as not having available benchmarks includes:
  using calculated similarities to identify services which are similar to each of the desired services determined as not having available benchmarks,
    wherein the calculated similarities are determined using one or more similarity criteria selected from the group consisting of geography, delivery location, scope and configuration.

9. The computer program product of claim 8, wherein re-computing the draft benchmarks and the corresponding confidence weights for each of the respective desired services includes using an aggregation function.

10. The computer program product of claim 9, the program instructions readable and/or executable by the processor to cause the processor to perform the method comprising:
  for each of the respective desired services, determining, by the processor, a number of previously submitted offers which included the given desired service and which were accepted;
  in response to determining that the number of previously submitted offers which included the given desired service and which were accepted is one, aggregating, by the processor, each of the draft benchmarks in the one previously submitted offer which was not accepted and a corresponding draft benchmark in the one previously submitted offer; and
  aggregating, by the processor, each of the confidence weights in the submitted offer which was not accepted and a corresponding confidence weight in the one previously submitted offer.

11. The computer program product of claim 9, the program instructions readable and/or executable by the processor to cause the processor to perform the method comprising:
  for each of the respective desired services, determining, by the processor, a number of previously submitted offers which included the given desired service and which were accepted;
  in response to determining that the number of previously submitted offers which included the given desired service and which were accepted is greater than one, calculating, by the processor, a norm between each of the draft benchmarks in the submitted offer which was not accepted and a corresponding draft benchmark in each of the previously submitted offers; and
  calculating, by the processor, a norm between each of the confidence weights in the submitted offer which was not accepted and a corresponding confidence weight in each of the previously submitted offers.

12. The computer program product of claim 8, the program instructions readable and/or executable by the processor to cause the processor to perform the method comprising:
  populating, by the processor, the desired services for each offer included in the offer request,
    wherein populating the desired services includes:
      using text mining on an offering basis from one or more sources,
      wherein the one or more sources include industry research data as well as engagement and neighboring country data,
      wherein the data included in the one or more sources is received from a consultant,
    wherein determining whether available benchmarks exist for each of the at least one desired service included in each of the selected available offerings includes:
      accessing historical information from memory, and
      using the historical information to decide whether a desired number of the desired services are included in each of the selected available offerings.

13. The computer program product of claim 12, the program instructions readable and/or executable by the processor to cause the processor to perform the method comprising:
  re-computing, by the processor, the draft benchmarks and the corresponding confidence weights for each of the respective desired services in response to determining that an aggregate confidence weight of the constructed offer is not in a predefined range.

14. The computer program product of claim 8, wherein submitting the offer to the potential customer includes:
sending the offer directly to the potential customer in an electronic document via email and/or in a physical document mailed to a prespecified address,
wherein the offer includes corresponding pricing information.

15. A system, comprising:
a processor, wherein the processor is located at a service provider location;
memory that is coupled to the processor; and
logic integrated with the processor, executable by the processor, or integrated with and executable by the processor, the logic being configured to:
receive, by the processor, an offer request from a potential customer, wherein the offer request includes desired services;
populate, by the processor, the desired services for each offer included in the offer request, wherein populating the desired services includes: using text mining on an offering basis from one or more sources;
determine, by the processor, a grouping of available offerings, wherein each of the available offerings in the grouping includes an available service which corresponds to at least one of the desired services;
calculate, by the processor, a quantifiable similarity between each of the available offerings in the grouping of available offerings and the desired services, respectively;
use, by the processor, the quantifiable similarities to determine whether the available offerings in the grouping of available offerings are sufficiently similar to the desired services;
determine, by the processor, whether available benchmarks exist for each of the available services included in the grouping of available offerings;
for each available service determined as not having available benchmarks:
 access, by the processor, historical information stored in the memory,
 identify, by the processor, portions of the historical information which are sufficiently similar to information known about the desired services included in the offer request,
 use, by the processor, the identified portions of the historical information to compute a draft benchmark for each of a plurality of criteria, and
 use, by the processor, the identified portions of the historical information to compute a confidence weight for each of the draft benchmarks;
assess, by the processor, existing deals which currently use the available benchmarks and the draft benchmarks, wherein the existing deals include previously issued offers which have been accepted and previously issued offers which have not yet been accepted or denied;
use, by the processor, the available benchmarks, the draft benchmarks, and the confidence weights to construct an offer;
submit, by the processor, the offer to the potential customer in response to the received offer request;
re-compute, by the processor, the draft benchmarks and the corresponding confidence weights for each of the respective available services in response to determining that the submitted offer was not accepted;
standardize, by the processor, the re-computed draft benchmarks;
store, by the processor, the standardized re-computed draft benchmarks in memory;
use, by the processor, the re-computed draft benchmarks and corresponding confidence weights to calculate new draft benchmarks and new corresponding confidence weights;
construct, by the processor, a new offer using the new draft benchmarks and the new corresponding confidence weights;
output, by the processor, the new offer and corresponding pricing information to a field presented on a prespecified website; and
send, by the processor, an electronic document directly to the potential customer, the electronic document including the new offer and corresponding pricing information.

16. The system of claim 15, the logic being configured to:
for each of the respective desired services, determine, by the processor, a number of previously submitted offers which included the given desired service and which were accepted;
in response to determining that the number of previously submitted offers which included the given desired service and which were accepted is one, aggregate, by the processor, each of the draft benchmarks in the one previously submitted offer which was not accepted and a corresponding draft benchmark in the one previously submitted offer;
aggregate, by the processor, each of the confidence weights in the submitted offer which was not accepted and a corresponding confidence weight in the one previously submitted offer;
in response to determining that the number of previously submitted offers which included the given desired service and which were accepted is greater than one, calculate, by the processor, a norm between each of the draft benchmarks in the submitted offer which was not accepted and a corresponding draft benchmark in each of the previously submitted offers; and
calculate, by the processor, a norm between each of the confidence weights in the submitted offer which was not accepted and a corresponding confidence weight in each of the previously submitted offers.

17. The system of claim 15, wherein determining the grouping of available offerings includes comparing benchmarks of the available offerings with benchmarks of the desired services, wherein the benchmarks of the available offerings and the benchmarks of the desired services correspond to geography, delivery location, scope of service, and configuration criteria, respectively.

18. The system of claim 15, wherein assessing the existing deals includes:
determining whether the previously issued offers in the existing deals have been accepted by a respective potential user;
in response to determining that one or more of the previously issued offers in a given existing deal has been accepted by a potential user, determine whether a combined confidence weight of the accepted one or more previously issued offers is above a user-defined threshold;
in response to determining that the combined confidence weight of the accepted one or more previously issued offers is above the user-defined threshold, standardizing the draft benchmarks for each of the services included in the accepted one or more previously issued offers; and in response to determining that the combined confidence weight of the accepted one or more previously issued offers is not above the user-defined threshold, re-computing the draft benchmarks and the corresponding confidence weights for each of the services included in the accepted one or more previously issued offers.

19. The system of claim 18, wherein the one or more sources include industry research data as well as engagement and neighboring country data, wherein the one or more sources receive the data included therein from a consultant, wherein calculating the quantifiable similarity includes incorporating engagement data, industry research data, and nearby geography benchmark data.

20. The system of claim 19, wherein computing the draft benchmarks for each desired service determined as not having available benchmarks includes:

using calculated similarities to identify services which are similar to each of the desired services determined as not having available benchmarks, wherein the calculated similarities are determined using one or more similarity criteria selected from the group consisting of geography, delivery location, scope and configuration, wherein the quantifiable similarity is calculated using the following equation:

$$S_{ij} = \sqrt{\sum_{k \in K} (price_k^i - price_k^j)^2}$$

wherein $s_{ij}$ represents the quantifiable similarity between benchmarking of services from the engagement data i and each externally available industry data j, wherein $price_k^i$ represents a price of service k for the engagement data i, wherein $price_k^j$ represents a price of service k for industry data j, wherein K represents a set of regular sub-services in the engagement data i, wherein computing the confidence weights includes: using a weighting function, wherein the weighting function uses a source of each of the draft benchmarks as an input and generates an aggregate weight for the respective draft benchmark, wherein determining the grouping of available offerings includes determining a relative similarity between each of the available services and the desired services.

* * * * *